(12) United States Patent
Padron

(10) Patent No.: US 10,266,934 B1
(45) Date of Patent: Apr. 23, 2019

(54) SELECTIVE COATING TO INHIBIT CRACKING FROM GALVANIZING

(71) Applicant: Sabre Communications Corporation, Sioux City, IA (US)

(72) Inventor: Leo Dan Padron, Springtown, TX (US)

(73) Assignee: Sabre Communications Corporation, Sioux City, IA (US)

( * ) Notice: Subject to any disclaimer, the term of this patent is extended or adjusted under 35 U.S.C. 154(b) by 305 days.

(21) Appl. No.: 15/172,954

(22) Filed: Jun. 3, 2016

(51) Int. Cl.
  *C23C 2/00*   (2006.01)
  *B32B 15/01*  (2006.01)
  *C23C 2/02*   (2006.01)
  *C23C 2/06*   (2006.01)

(52) U.S. Cl.
  CPC ............ *C23C 2/006* (2013.01); *B32B 15/013* (2013.01); *C23C 2/02* (2013.01); *C23C 2/06* (2013.01)

(58) Field of Classification Search
  None
  See application file for complete search history.

(56) References Cited

U.S. PATENT DOCUMENTS

| | | | | |
|---|---|---|---|---|
| 5,827,618 A * | 10/1998 | Oyagi | ................ | C23C 2/02 428/621 |
| 2009/0053551 A1* | 2/2009 | Sakamoto | ................ | C21D 9/46 428/603 |
| 2011/0253691 A1* | 10/2011 | Kodama | ................ | B23K 9/23 219/137 R |
| 2016/0265116 A1* | 9/2016 | Guttler | ................ | C10M 173/02 |

OTHER PUBLICATIONS

Duran III, Bernardo, "Masking Materials for Preventing Hot-Dip Galvanizing", AGA Galvanizing Note, (2010), 1-34.

* cited by examiner

*Primary Examiner* — John J Figueroa
(74) *Attorney, Agent, or Firm* — Schwegman Lundberg & Woessner, P.A.

(57) ABSTRACT

A process for making a workpiece, e.g., such as a utility or communications monopole can include selectively masking welded regions (e.g., joining the pole to a collar or other portion of a base, or joining component parts of the pole) before a corrosion-inhibiting galvanizing process that can include precleaning (e.g., in a hot acid bath) and a hot zinc galvanizing bath. The masking material can than optionally be removed, such as abrasively. The unmasked regions can optionally be spot-treated, if desired, such as to inhibit corrosion.

20 Claims, 1 Drawing Sheet

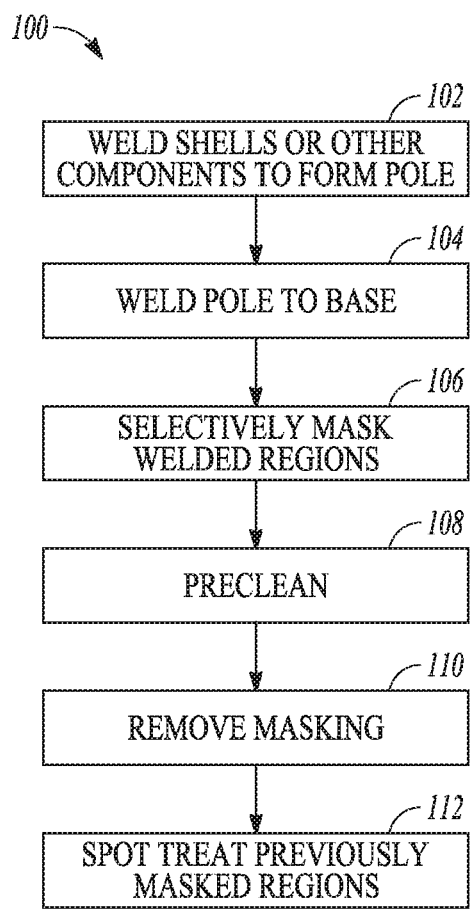

SELECTIVE COATING TO INHIBIT CRACKING FROM GALVANIZING

TECHNICAL FIELD

This document pertains generally, but not by way of limitation, to galvanizing such as for utility or communications poles or other articles of manufacture.

BACKGROUND

Utility poles can be used for raising lights, communications antennas, or other equipment above the surface of the ground, from which the pole extends upward. Utility poles can include monopoles, such as can be made from steel or other materials. A monopole can be constructed by bending two long flat metal steel sheets lengthwise into half-hexagonal-profile or similarly multifaceted or other shells, then welding these two shells together to produce an elongated hexagonally cylindrical pole. This long pole can then, in turn, be welded to a metal base. Erecting the pole can include bolting or otherwise mounting the metal base to a concrete slab or other foundation, from which the pole can extend vertically upward as a self-supporting structure.

SUMMARY

The present inventor has recognized, among other things, that inhibiting corrosion of the utility pole is often desirable to obtain a longer-lasting product, particularly where the utility pole can be exposed to corrosive elements, such as road salt, etc. However, the present inventor has also recognized that using a hot zinc bath for galvanizing the utility pole to inhibit corrosion can cause cracks at the weld, particularly at the weld between the pole and the base, and that such toe cracks can propagate into the base or pole structures, which could potentially impact the structural integrity of the base or pole structures. Accordingly, this document describes, among other things, a process for selectively masking the weld, such as before a pre-cleaning and a hot zinc bath in the galvanizing process.

This document describes, among other things, a process for making a workpiece, such as can include but is not limited to a utility or communications monopole. The process can include selectively masking welded regions (e.g., joining the pole to a collar or other portion of a base, or joining component parts of the pole) before a corrosion-inhibiting galvanizing process that can include precleaning (e.g., in a hot acid bath) and a hot zinc galvanizing bath. The masking material can than optionally be removed, such as abrasively. The unmasked regions can optionally be spot-treated, if desired, such as to inhibit corrosion.

Aspect 1 can include or use subject matter (such as an apparatus, a system, a device, a method, a means for performing acts, or a device readable medium including instructions that, when performed by the device, can cause the device to perform acts), such as can include or use process for manufacturing or galvanizing a workpiece including a pole welded to a base. The process can include selectively covering at least the welded portions of the workpiece using a masking material, while leaving other portions of the workpiece exposed. The process can include cleaning the selectively masked workpiece using an acid bath. The process can include galvanizing the cleaned and selectively masked workpiece using a hot zinc bath.

Aspect 2 can include or use, or can optionally be combined with the subject matter of Aspect 1, to optionally include or use removing at least some of the masking material after the galvanizing.

Aspect 3 can include or use, or can optionally be combined with the subject matter of one or any combination of Aspects 1 or 2 such that the removing at least some of the masking material after the galvanizing can optionally include or use abrasively removing the at least some of the masking material.

Aspect 4 can include or use, or can optionally be combined with the subject matter of one or any combination of Aspects 1 through 3 to optionally include or use abrasively removing such as including using a wire brush.

Aspect 5 can include or use, or can optionally be combined with the subject matter of one or any combination of Aspects 1 through 4 such as to optionally include or use the abrasively removing including using a grinder.

Aspect 6 can include or use, or can optionally be combined with the subject matter of one or any combination of Aspects 1 through 5 such as to optionally include or use spot-treating regions exposed by the removing at least some of the masking material after galvanizing.

Aspect 7 can include or use, or can optionally be combined with the subject matter of one or any combination of Aspects 1 through 6 such as to optionally include or use the selectively covering including using, as the masking material, acrylic paint.

Aspect 8 can include or use, or can optionally be combined with the subject matter of one or any combination of Aspects 1 through 7 such as to optionally include or use the selectively covering including using, as the masking material, silicone-based caulking.

Aspect 9 can include or use, or can optionally be combined with the subject matter of one or any combination of Aspects 1 through 8 such as to optionally include or use the selectively covering including using, as the masking material, adhesive tape.

Aspect 10 can include or use, or can optionally be combined with the subject matter of one or any combination of Aspects 1 through 9 such as to optionally include or use the cleaning including exposing the selectively covered workpiece to an acid bath.

Aspect 11 can include or use, or can optionally be combined with the subject matter of one or any combination of Aspects 1 through 10 such as to optionally include or use the cleaning including exposing the selectively covered workpiece to an acid bath that includes sulfuric acid.

Aspect 12 can include or use, or can optionally be combined with the subject matter of one or any combination of Aspects 1 through 11 such as to optionally include or use cleaning such as including exposing the selectively covered workpiece to an acid bath that includes hydrochloric acid.

Aspect 13 can include or use, or can optionally be combined with the subject matter of one or any combination of Aspects 1 through 12 such as to optionally include or use selective covering such as can include selectively covering a weld extending longitudinally along the pole.

Aspect 14 can include or use, or can optionally be combined with the subject matter of one or any combination of Aspects 1 through 13 such as to optionally include or use the selective covering including selectively covering a weld joining a proximal end of the pole to a collar portion of the base.

Aspect 15 can include or use, or can optionally be combined with the subject matter of one or any combination of Aspects 1 through 14 such as to optionally include or use the selective covering including selectively covering at least the welded portions of the workpiece and areas around the welded portions of the workpiece using a masking material.

Aspect 16 can include or use, or can optionally be combined with the subject matter of one or any combination of Aspects 1 through 15 such as to optionally include or use the selectively covering including selectively covering at least the welded portions that weld a pole to a base.

Aspect 17 can include or use, or can optionally be combined with the subject matter of one or any combination of Aspects 1 through 16 such as to optionally include or use a process for manufacturing or galvanizing a workpiece. The process can comprise selectively covering at least the welded portions of the workpiece using a masking material, while leaving other portions of the workpiece exposed.

The process can comprise cleaning the selectively masked workpiece using an acid bath. The process can comprise galvanizing the cleaned and selectively masked workpiece using a hot zinc bath.

Aspect 18 can include or use, or can optionally be combined with the subject matter of one or any combination of Aspects 1 through 17, such as to optionally include or use a utility or communications pole (or other article of manufacture) such as can comprise: a base; a shaft, welded to the base by a weld; and a galvanizing-inhibiting covering selectively covering at least the weld while leaving other portions of the base or shaft exposed.

Aspect 19 can include or use, or can optionally be combined with the subject matter of one or any combination of Aspects 1 through 18, such as to optionally include or use the other portions of the base or shaft include a galvanized metal surface.

Aspect 20 can include or use, or can optionally be combined with the subject matter of one or any combination of Aspects 1 through 19, such as to optionally include or use an article of manufacture such as can comprise a first piece; a second piece orthogonally welded to the first piece by a weld; and a galvanizing-inhibiting covering selectively covering at least the weld while leaving other portions of the first or second pieces exposed.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 is a flow chart illustrating an example of portions of a process for making a galvanized product.

DETAILED DESCRIPTION

This document describes, among other things, a process for selectively masking a weld and optionally the area around a weld, such as between a base and utility pole shaft, such as before a pre-cleaning and a hot zinc bath in the galvanizing process, such as to inhibit or prevent toe-cracking.

FIG. 1 is a flow chart illustrating an example of portions of a process 100 for making a galvanized product, such as a utility or telecommunications structure, such as a monopole or other pole. At 102, after elongated steel or other metal sheets can be bent longitudinally into half-hexagon or other half-shells or other components, these half-shells can be welded together lengthwise such as to form a long pole. At 104, the long pole can be welded to a base, which can include a flat metal sheet or a flat metal sheet with an upwardly-protruding generally cylindrical (or hexagonal or multifaceted) collar or bracket (e.g., which can include a single-piece or multiple pieces) into which a proximal end of the long pole can be inserted and welded thereto. At 106, the welded portions can be selectively masked, using a masking material, examples of which are described elsewhere in this document. Such welded portions being selectively masked can include the welds between the pole and the base (such as between the pole and the collar portion of the base). Such welded portions being selectively masked can additionally or alternatively optionally include weld portions extending longitudinally along the pole, such as the welds between the half-shells forming the pole. In an example, the selective masking can include coating such welded regions and a region extending about 1 inch beyond such welded regions, but not other regions on the pole or base, so that such other regions can be left exposed during the galvanizing process to inhibit corrosion at such other regions. Some illustrative examples of coatings that can be used to mask such welded regions can include, but are not limited to: silicone based caulking; floor paint; epoxy acrylic paint, duct tape, kapton tape, VHT header paint, Dow Corning Compound #111, DAP household adhesive sealant. Stop Galv, NAPA RTV Red, GE 100% silicone caulk. Galva Stop. Valmont masking compound, Macropoxy 846, 3M High Temperature Aluminum Tape, Maskote Zinc Stop-Off. ZYP Boron Nitride Lubricoat, ZYP Boron Nitride Hardcoat, among others.

At 108, the selectively-masked workpiece (e.g., pole and base) can be pre-cleaned, such as part of the galvanizing process before being exposed to a hot zinc bath. In an example, the pre-cleaning can include dipping the workpiece in an acid bath, such as can include a hot bath (e.g., 150 degrees Fahrenheit for 30-35 minutes) that can include sulfuric acid ($H_2SO_4$) or hydrochloric acid (HCl). The masking can selectively inhibit or prevent the acid from reaching the welded regions during such pre-cleaning.

At 110, the pre-cleaned workpiece can be immersed in a hot zinc bath (e.g., 840 degrees Fahrenheit for 15-20 minutes) that can include melted zinc, such as to galvanize the unmasked portions of the workpiece. The masking can inhibit or prevent the zinc bath from reaching the welded regions that were selectively masked.

At 110, the masking can optionally be removed, such as by abrasion, e.g., using a steel brush or a sanding disk or a grinder. Alternatively, the masking can be left on, if desired, such as when the masking material is capable of providing some degree of corrosion protection to the underlying welded portions.

At 112, overlapped regions near the weld that were masked, but are now exposed, can optionally be selectively spot-treated, such as to provide corrosion resistance in these regions. This can be done, for example, using one or more of coating with zinc-rich paint, spray metalizing, or zinc solder.

In an experimental example, BEHR Epoxy Acrylic floor paint was used as the masking coating that was selectively applied to the toe line ("knuckle") region of the base-to-shaft weld in the process described in FIG. 1. Post-galvanizing inspection was performed. The verifications of cracks were done by magnetic particle inspection as well as ultrasonic inspection by certified inspectors and by certified equipment. The results are presented in Table 1 (no masking/coating) and Table 2 (with masking/coating), below, which demonstrated a remarkable decrease in toe-cracks using the selective masking process.

TABLE 1

Number of cracked knuckles, with no coatings
(control parts, each included 12 total knuckles)

Sample 1 = 12
Sample 2 = 12
Sample 3 = 12
Sample 4 = 12
Sample 5 = 12
Sample 6 = 12
Sample 7 = 12
Sample 8 = 12
Sample 9 = 12
Sample 10 = 12
Sample 11 = 12
Sample 12 = 12
Sample 13 = 12
Sample 14 = 12
Sample 15 = 12
Sample 16 = 12
Sample 1.7 = 12
Sample 18 = 12
Sample 19 = 12
Sample 20 = 12
Sample21 = 12
Sample 22 = 12
Sample 23 = 11
Sample 24 = 11
Sample 25 = 11
Sample 26 = 11
Sample 27 = 11
Sample 28 = 11
Sample 29 = 11
Sample 30 = 11
Sample 31 = 10
Sample 32 = 10
Sample 33 = 10
Sample 34 = 10
Sample 35 = 10
Sample 36 = 10
Sample 37 = 10
Sample 38 = 10
Sample 39 = 10
Sample 40 = 10
Sample 41 = 10
Sample 42 = 10
Sample 43 = 10
Sample 44 = 10
Sample 45 = 10
Sample 46 = 10
Sample 47 = 10
Sample 48 = 10
Sample 49 = 9
Sample 50 = 9
Sample 51 = 9
Sample 52 = 9
Sample 53 = 9
Sample 54 = 8
Sample 55 = 8
Sample 56 = 8
Sample 57 = 7
Sample 58 = 7
Sample 59 = 7
Sample 60 = 6
Sample 61 = 6
Sample 62 = 6
Sample 63 = 6
Sample 64 = 6
Sample 65 = 6
Sample 66 = 5
Sample 67 = 5

TABLE 1-continued

Number of cracked knuckles, with no coatings
(control parts, each included 12 total knuckles)

Sample 68 = 5
Sample 69 = 5
Sample 70 = 5
Sample 71 = 5
Sample 72 = 4
Sample 73 = 4
Sample 71 = 4
Sample 75 = 4
Sample 76 = 3
Sample 77 = 3
Sample 78 = 3
Sample 79 = 2
Sample 80 = 2
Sample 81 = 2
Sample 82 = 2
Sample 83 = 1
Sample 84 = 1
Sample 85 = 1
Sample 86 = 1
Sample 87 = 1
Sample 88 = 1
Sample 89 = 1
Sample 90 = 0
Sample 91 = 0
Sample 92 = 0

TABLE 2

Number of cracked knuckles, with selective knuckle coatings
(test parts, each included 12 total knuckles)

Sample 1 = 0
Sample 2 = 0
Sample 3 = 0
Sample 4 = 0
Sample 5 = 0
Sample 6 = 0
Sample 7 = 0
Sample 8 = 0
Sample 9 = 0
Sample 10 = 0
Sample 11 = 0
Sample 12 = 0
Sample 13 = 0
Sample 14 = 0
Sample 15 = 0
Sample 16 = 0
Sample 17 = 0
Sample 18 = 0
Sample 19 = 0
Sample 20 = 0
Sample 21 = 0
Sample 22 = 0
Sample 23 = 0
Sample 24 = 0
Sample 25 = 0
Sample 26 = 0
Sample 27 = 0
Sample 28 = 0
Sample 29 = 0
Sample 30 = 0
Sample 31 = 0
Sample 32 = 1
Sample 33 = 0
Sample 34 = 0
Sample 35 = 3
Sample 36 = 0
Sample 37 = 0
Sample 38 = 1
Sample 39 = 0
Sample 40 = 0
Sample 41 = 0
Sample 42 = 0
Sample 43 = 0

TABLE 2-continued

Number of cracked knuckles, with selective knuckle coatings
(test parts, each included 12 total knuckles)

Sample 44 = 0
Sample 45 = 0
Sample 46 = 0
Sample 47 = 0
Sample 48 = 0
Sample 49 = 2
Sample 50 = 0
Sample 51 = 2

In sum, the selective masking process to cover welded regions significantly reduced cracking due to galvanizing.

VARIOUS NOTES

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. For example, the process can be used not only with utility or communications poles, but with other workpieces that can benefit from galvanizing, such as at a joint that may otherwise experience toe-cracking in the absence of the selective masking described herein. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel". "perpendicular". "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A process for manufacturing or galvanizing a workpiece including a pole welded to a base, the process comprising:
    selectively covering at least the welded portions of the workpiece using a masking material, while leaving other portions of the workpiece exposed;
    cleaning the selectively masked workpiece using an acid bath; and
    galvanizing the cleaned and selectively masked workpiece using a hot zinc bath.

2. The process of claim 1, comprising removing at least some of the masking material after the galvanizing.

3. The process of claim 2, wherein the removing at least some of the masking material after the galvanizing includes abrasively removing the at least some of the masking material.

4. The process of claim 3, wherein abrasively removing includes using a wire brush.

5. The process of claim 3, wherein the abrasively removing includes using a grinder.

6. The process of claim 2, comprising spot-treating regions exposed by the removing at least some of the masking material after galvanizing.

7. The process of claim 1, wherein the selectively covering includes using, as the masking material, acrylic paint.

8. The process of claim 1, wherein the selectively covering includes using, as the masking material silicone-based caulking.

9. The process of claim 1, wherein the selectively covering includes using, as the masking material, adhesive tape.

10. The process of claim 1, wherein the cleaning includes exposing the selectively covered workpiece to an acid bath.

11. The process of claim 10, wherein the cleaning includes exposing the selectively covered workpiece to an acid bath that includes sulfuric acid.

12. The process of claim 11, wherein the cleaning includes exposing the selectively covered workpiece to an acid bath that includes hydrochloric acid.

13. The process of claim 1, wherein the selective covering includes selectively covering a weld extending longitudinally along the pole.

14. The process of claim 1, wherein the selective covering includes selectively covering a weld joining a proximal end of the pole to a collar portion of the base.

15. The process of claim 1, wherein the selective covering includes selectively covering at least the welded portions of the workpiece and areas around the welded portions of the workpiece using a masking material.

16. The process of claim 1, wherein the selectively covering includes selectively covering at least the welded portions that weld a pole to a base.

17. The process of claim 1, wherein the workpiece includes a utility or communications pole comprising:
a base; and
a shaft, welded to the base by a weld.

18. A process for manufacturing or galvanizing a workpiece, the process comprising:
selectively covering at least the welded portions of the workpiece using a masking material, while leaving other portions of the workpiece exposed;
cleaning the selectively masked workpiece using an acid bath; and
galvanizing the cleaned and selectively masked workpiece using a hot zinc bath.

19. A utility or communications pole comprising:
a base;
a shaft, welded to the base by a weld; and
a galvanizing-inhibiting covering selectively covering at least the weld while leaving other portions of the base or shaft exposed.

20. The pole of claim 19, wherein the other portions of the base or shaft include a galvanized metal surface.

* * * * *

UNITED STATES PATENT AND TRADEMARK OFFICE
CERTIFICATE OF CORRECTION

PATENT NO. : 10,266,934 B1
APPLICATION NO. : 15/172954
DATED : April 23, 2019
INVENTOR(S) : Leo Dan Padron Page 1 of 1

It is certified that error appears in the above-identified patent and that said Letters Patent is hereby corrected as shown below:

In the Claims

Column 9, Line 2, Claim 8, after "material", insert --,--

Signed and Sealed this
Twenty-eighth Day of April, 2020

Andrei Iancu
*Director of the United States Patent and Trademark Office*